Figure 1:
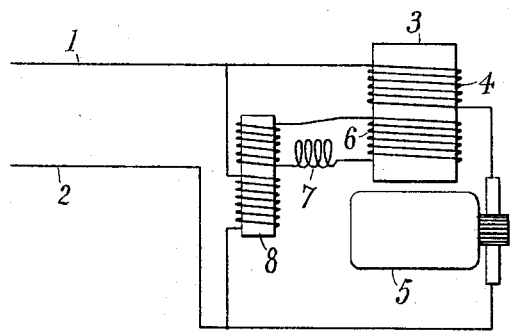

No. 759,004. PATENTED MAY 3, 1904.
B. McCOLLUM.
ALTERNATING CURRENT MOTOR.
APPLICATION FILED APR. 4, 1903.
NO MODEL.

Witnesses:
Raphaël Netter
A.S. Dunham

Burton McCollum, Inventor,
by Kerr, Page & Cooper, Att'ys.

No. 759,004. Patented May 3, 1904.

UNITED STATES PATENT OFFICE.

BURTON McCOLLUM, OF LAWRENCE, KANSAS.

ALTERNATING-CURRENT MOTOR.

SPECIFICATION forming part of Letters Patent No. 759,004, dated May 3, 1904.

Application filed April 4, 1903. Serial No. 151,120. (No model.)

*To all whom it may concern:*

Be it known that I, BURTON McCOLLUM, a citizen of the United States, residing at Lawrence, county of Douglas, State of Kansas, have invented certain new and useful Improvements in Alternating-Current Motors, of which the following is a specification, reference being had to the drawings accompanying and forming part of the same.

My invention relates to electric motors operated by alternating current, and has for its object to produce a motor which shall have a higher power factor than others now known of the same general type, and thereby to impart a higher efficiency and capacity to the generating plant which supplies power to such a motor or system of such motors.

It is well understood by persons skilled in the art that the efficiency and capacity of an alternating-current generating plant and transmission-line are considerably lower when supplying power to an inductive than to a non-inductive load. The reason assigned for this is based upon the fact that the power factor of an alternating current is the product of three factors—the current, the electromotive force, and the cosine of the phase angle between the current and the electromotive force. This cosine is called the "power factor" of the circuit.

The maximum volt-ampere output of a given generator—that is, the maximum product of volts and amperes which it is capable of delivering—is limited by practical considerations—such as heating, speed, &c.—and this maximum value will be the same no matter what may be the power factor of the receiving-circuit. The power represented by a given volt-ampere product is dependent upon the power factor, and the greater this factor the greater the power will be. Hence if the power factor of the receiving-circuit can be increased the amount of power which a given alternator can deliver into it will be proportionally increased. Furthermore, the losses in a given alternating-current generator for a given volt-ampere output will be the same no matter whether the power factor of the external circuit be small or large, and since the power represented by such volt-ampere product is increased directly as the power factor is increased it follows that the efficiency of such a generator is increased by raising the power factor of the receiving-circuit to which it supplies power.

In accordance with the above well-known theory numerous attempts have been made to raise the power factor in an inductive receiving-circuit; but in a certain class of motors, of which I hereinafter describe a specific type, the methods employed have either failed of their purpose or have been subject to certain disadvantages which limited their practical application. The invention which forms the subject of the present application, however, I have found after an extended series of tests overcomes the difficulties hitherto encountered and accomplishes successfully the object sought.

The invention consists, broadly stated, in means for producing in the field of the motor a special component of magnetism in phase with the main component in space, but differing therefrom in time, preferably by ninety degrees.

The class of receiving-circuits in which my invention finds readiest application includes all such as consist wholly or in part of an alternating-current series commutating-motor or system of such motors. One of the unfortunate peculiarities of this type is its low power factor, and since the chief object of my invention is to overcome such defect in that particular class I shall describe the invention as applied in such cases.

The main current supplied to the motor produces in the field the main component of magnetism, which is approximately in phase with the current producing it and which, as is well understood, produces the torque of the motor. My improvement produces in the same field a second component of magnetism, which is approximately in quadrature with the main component in time, but in phase therewith in space. No independent source of power is necessary for producing this quadrature component. The two thus superposed produce a resultant field magnetism, which lags behind the main current by a definite phase angle. The magnitude of this angle depends upon the relative magnitude of the two components of magnetism and can be varied to suit individual conditions. The resultant field acting upon the moving armature-conductors induces therein an electromotive force which has a component in opposition to the electromotive force of self-induction of the armature and of any circuit in series therewith. The result is therefore to neutralize the effects of such self-induction. Hence the impressed electromotive force and current are brought more nearly in phase with each other, and the power factor of the motor is consequently increased.

In the accompanying drawings are shown diagrammatically two of the means which I have found are successful embodiments of my invention.

Figure 2:
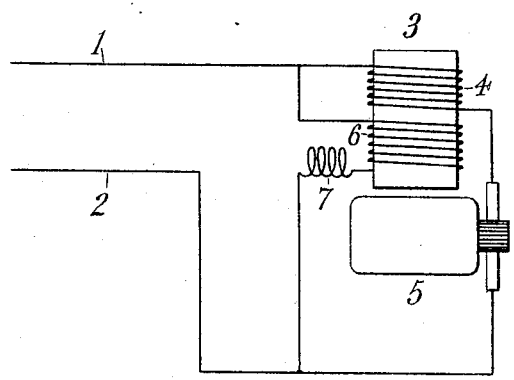

Figure 1 is a motor of the type described, a transformer being employed therewith in carrying out my invention. Fig. 2 is a motor of the same class, the invention being embodied therein without the use of a transformer.

The supply-mains or source of power are indicated by 1 2.

3 is the field-frame of the motor, and 4 is the main winding thereon as ordinarily used on the series commutating-machine. This winding is usually connected in series with the armature 5 across the mains, as shown, but sometimes to the secondary of a transformer whose primary is in series with the armature across the mains.

6 is an auxiliary field-winding which I employ for the purpose of producing the quadrature magnetic component described above. It is wound upon the same core along with the main winding. In order to prevent too large a current from flowing in the auxiliary field, an inductive resistance 7 is provided. By using a variable inductance it may also be used for adjusting and regulating the strength of the current. The arrangement by which I have obtained the best results is illustrated in Fig. 1. There the terminals of the auxiliary winding are connected through the inductance 7 to the secondary of a transformer 8, the primary of which is connected across the supply-mains, as shown. As will be readily seen, the auxiliary winding is in inductive relation with the main winding, and hence an electromotive force is induced therein by the periodic reversals of the field magnetism. This induced electromotive force, which is a quarter of a period behind the inducing magnetism, is superposed upon the electromotive force induced in the secondary of the transformer. The resultant electromotive force causes a current to flow in the auxiliary field-winding, producing a magnetic component very nearly in phase with it. The phase of the auxiliary current, and hence that of the magnetism created by it, may be varied at will by varying the number of turns in the auxiliary winding and in the transformer. By a proper proportioning of the two the current in the auxiliary may be made to flow very nearly in quadrature with the main current, and hence will produce the desired quadrature component.

The arrangement just described when properly constructed I have found to be very effective. It enables the motor to operate with a high power factor and high efficiency throughout a wide range of speed. I have not only been able to make the motor operate with a power factor of unity, but by increasing the intensity of the quadrature component to the proper value I have made the current lead the electromotive force, and thus caused the motor to act as a negative reactance.

In the plan illustrated in Fig. 2 the transformer is dispensed with and the terminals of the auxiliary winding are connected directly to the mains through a suitable inductance. Here the inductance is introduced for the same purpose as before—to regulate the strength of the current in the auxiliary winding and also to make the current lag behind the electromotive force. In this case the self-induced electromotive force of the inductance 7 and the electromotive force induced in the auxiliary field are superposed upon the impressed electromotive force of the supply-mains, and consequently a resultant electromotive force is produced which causes a current to flow through the auxiliary winding very nearly in quadrature with the main current. Thus the quadrature component of magnetism is created.

It should be understood, of course, that the two arrangements above described are not the only embodiments of my invention, and I therefore do not consider myself limited thereto. In fact, I have successfully used many other embodiments, and with several I have succeeded in making the motor operate with a maximum power factor of unity.

What I claim is—

1. In a motor of the class described, the combination with the field in series with the armature, of means for superposing on the field an auxiliary component of magnetism in phase therewith in space and substantially in quadrature therewith in time, as and for the purposes set forth.

2. In a motor of the class described, the combination with the field in series with the armature, of an auxiliary field-winding adapted to produce an auxiliary component of magnetism in phase with the main field component in space and out of phase therewith in time, as and for the purposes set forth.

3. In a motor of the class described, the combination with the field in series with the armature, of an auxiliary field-winding in parallel with the main field-winding, adapted to produce a magnetic component in phase with the main component in space and out of phase therewith in time, as and for the purposes set forth.

4. In a motor of the class described, the combination with the field in series with the armature, of an auxiliary field-winding in parallel with the main field-winding, and a self-inductance, as and for the purposes set forth.

5. In a motor of the class described, the combination with the field in series with the armature, and the supply-mains, of a transformer having its primary connected across the mains, an auxiliary field-winding connected to the secondary of the transformer, and a self-inductance between said transformer and the auxiliary winding, as and for the purposes set forth.

BURTON McCOLLUM.

Witnesses:
LUCIEN I. BLAKE,
EDWIN F. STIMPSON.